United States Patent [19]

Wallace et al.

[11] Patent Number: 4,945,134

[45] Date of Patent: Jul. 31, 1990

[54] INTERPOLYMERS HAVING COLOR AND HEAT STABILITY AS WELL AS OXYGEN BARRIER PROPERTIES

[75] Inventors: Karen L. Wallace; Dolk Lee, both of Midland, Mich.

[73] Assignee: The Dow Chemical Company, Midland, Mich.

[21] Appl. No.: 282,654

[22] Filed: Dec. 12, 1988

[51] Int. Cl.$^5$ .................. C08F 214/08; C08F 111/08
[52] U.S. Cl. ...................... 525/301; 525/309; 525/317; 526/318.4; 526/343; 526/329.4
[58] Field of Search ............... 526/318.4, 343, 329.4; 525/301, 309, 317

[56] References Cited

U.S. PATENT DOCUMENTS

| | | | |
|---|---|---|---|
| 3,832,335 | 8/1974 | Bayer | 526/343 |
| 3,859,384 | 1/1975 | Carty et al. | 526/345 |

*Primary Examiner*—Joseph L. Schofer
*Assistant Examiner*—Jeffrey T. Smith

[57] ABSTRACT

The polymers of ethylenically unsaturated monomers exhibit a greater degree of clarity and a greater degree of heat stability than do vinylidene chloride copolymers but do not have the barrier properties of vinylidene chloride copolymers. The present invention is an emulsion polymerized interpolymer, which provides both clarity and low oxygen permeability to applications where such properties are required of a polymer, having two miscible phases, which comprises (a) a first phase of an effective amount of at least one ethylenically unsaturated monomer and (b) a second phase of an effective amount of vinylidene chloride monomer and at least one ethylenically unsaturated comonomer wherein the first phase and the second phase are miscible.

7 Claims, No Drawings

INTERPOLYMERS HAVING COLOR AND HEAT STABILITY AS WELL AS OXYGEN BARRIER PROPERTIES

BACKGROUND OF THE INVENTION

The present invention incorporates using vinylidene chloride monomers in combination with ethylenically unsaturated comonomers to prepare an emulsion polymerized interpolymer that is color stable, thermally and chemically stable, and provides barrier properties.

Vinylidene chloride copolymers are well known in the art to exhibit oxygen barrier properties. However, such vinylidene chloride copolymers are also thermally sensitive, exhibiting degradation and discoloration upon processing at elevated temperatures. The higher temperatures cause a breakdown of the copolymer which then causes discoloring in the article into which the copolymer is fabricated. The polymers of ethylenically unsaturated monomers exhibit a greater degree of clarity and a greater degree of heat stability than do vinylidene chloride copolymers but do not have the barrier properties of vinylidene chloride copolymers. Therefore, a polymer useful for applications requiring the properties of each copolymer that is, both clarity and low oxygen permeability, would be desirable.

SUMMARY OF THE INVENTION

Accordingly, the present invention is an emulsion polymerized interpolymer particle of (1) a vinylidene chloride monomer and at least one ethylenically unsaturated comonomer phase and (2) an ethylenically unsaturated monomer phase wherein the vinylidene chloride monomer and ethylenically unsaturated comonomer phase is miscible with the ethylenically unsaturated monomer phase. The latex can then be coagulated and subsequently undergo melt-processing and simultaneously provide thermal stability, clarity and oxygen barrier properties to the resulting interpolymer. Specifically, the present invention is an emulsion polymerized interpolymer having two miscible phases which comprises (a) a first phase of an effective amount of at least one ethylenically unsaturated monomer and (b) a second phase of an effective amount of vinylidene chloride monomer and at least one ethylenically unsaturated comonomer wherein the first phase and the second phase are miscible.

The present invention also provides for a method of preparing emulsion polymerized interpolymer particles, the particles having two miscible phases, the method comprising (a) polymerizing an effective amount of at least one ethylenically unsaturated monomer to form a polymer and (b) further polymerizing the polymer from (a) in the presence of an effective amount of vinylidine chloride monomer and an effective amount of at least one ethylenically unsaturated comonomer and (c) coagulating the resulting dispersion of polymerized interpolymer particles.

The present invention also provides for an alternate method of preparing emulsion polymerized interpolymer particles, the particles having two miscible phases, the method comprising (a) polymerizing an effective amount of vinylidene chloride monomer and at least one ethylenically unsaturated comonomer to form a polymer and (b) further polymerizing the polymer from (a) in the presence of an effective amount of at least one ethylenically unsaturated monomer and (c) coagulating the resulting dispersion of polymerized interpolymer particles.

DETAILED DESCRIPTION OF THE INVENTION

The present invention is an interpolymer particle and the process for preparing the interpolymer particle which entails emulsion polymerization of a first phase of at least one ethylenically unsaturated monomer and polymerizing the first phase with a second phase of monomer comprising vinylidene chloride monomer and at least one ethylenically unsaturated comonomer. The terms "first and second phases" are not meant to indicate the relative additions of one phase to another but merely to label and differentiate one phase from the other. The ethylenically unsaturated monomer phase can be added to the vinylidene chloride and comonomer phase or the vinylidene chloride and comonomer phase can be added to the ethylenically unsaturated monomer phase. The addition of the vinylidene chloride monomer and comonomer phase to the ethylenically unsaturated monomer phase is preferred to avoid exposing the vinylidene chloride monomer to high temperatures during the addition of the ethylenically unsaturated monomer phase.

"Miscibility" as used herein means the two phases defined as miscible with each other are, under polymerization conditions, solubilized in each other and result in a mixture which is transparent (i.e., clear) or at least translucent. Phases which are not miscible will maintain discrete phase structures and typically retain individual glass transition temperatures resulting in a latex copolymer particle having two discrete phases each phase having its own glass transition temperature. Further, "miscibility" as used herein, is defined to mean that the phases defined as miscible with each other are to be distinguished from different phases which when added to each other under similar conditions, are merely dispersible in each other wherein the dispersion is characterized by a white, milky appearance.

Suitable ethylenically unsaturated monomers and mixtures of monomers for the ethylenically unsaturated monomer phase include those monomers which will be miscible with the vinylidene chloride monomer and comonomer phase. Examples of such monomers include: alkyl acrylates, alkyl methacrylates, acrylonitrile, methacrylonitrile and mixtures of these monomers. Also suitable are styrene/acrylonitrile monomer mixtures. The alkyl acrylates and alkyl methacrylates are generally selected to have from about 1 to about 8 carbon atoms per alkyl group. Preferably, alkyl acrylates and alkyl methacrylates are selected to have from about 1 to about 4 carbon atoms per alkyl group. The alkyl acrylates and alkyl methacrylates are most preferably selected from the group consisting of methyl acrylate, ethyl acrylate, butyl acrylate and methylmethacrylate.

Vinylidene chloride copolymers suitable for use in the present invention are those vinylidene chloride polymers formed from a monomer mixture of vinylidene chloride monomer and one or more ethylenically unsaturated comonomers copolymerizable with vinylidene chloride monomer.

Suitable ethylenically unsaturated comonomers for the vinylidene chloride monomer and comonomer phase include ethylenically unsaturated comonomers copolymerizable with the vinylidene chloride monomer. Examples of such monomers include vinyl chloride, alkyl acrylates, alkyl methacrylates, acrylic acid, methacrylic acid, itaconic acid, acrylonitrile and methacrylonitrile. The alkyl acrylates and alkyl methacrylates are generally selected to have from about 1 to about 8 carbon atoms per alkyl group. Preferably, alkyl acrylates and alkyl methacrylates are selected to have from about 1 to about 4 carbon atoms per alkyl group. The alkyl acrylates and alkyl methacrylates are most preferably selected from the group consisting of methyl acrylate, ethyl acrylate, butyl acrylate and methylmethacrylate.

EFFECTIVE AMOUNTS FOR THE FIRST PHASE

The effective amount of ethylenically unsaturated monomer present in the first phase of the interpolymer particle of the present invention is typically from about 95 to about 5 weight percent based on total monomer present in the total interpolymer particle. Preferably, the effective amount of ethylenically unsaturated monomer present in the first phase of the interpolymer particle of the present invention is typically from about 80 to about 5 weight percent based on total monomer present in the total interpolymer particle. Most preferably, the effective amount of ethylenically unsaturated monomer present in the first phase is typically from about 60 to about 5 weight percent based on total monomer present in the total interpolymer particle.

EFFECTIVE AMOUNTS FOR THE SECOND PHASE

The effective amount of vinylidene chloride monomer and ethylenically unsaturated comonomer present in the second phase of the interpolymer particle of the present invention is typically from about 5 to about 95 weight percent based on total monomer present in the total interpolymer particle. Preferably, the effective amount of vinylidene chloride monomer and ethylenically unsaturated comonomer present in the second phase of the copolymer particle of the present invention is typically from about 20 to about 95 weight percent based on total monomer present in the total interpolymer particle. Most preferably, the effective amount of vinylidene chloride monomer and ethylenically unsaturated comonomer present in the second phase of the interpolymer particle of the present invention is typically from about 40 to about 95 weight percent based on total monomer present in the total interpolymer particle.

The effective amount of ethylenically unsaturated comonomer present in the second phase is from about 5 to about 25 weight percent based on total monomer present in the second phase. Preferably, the effective amount of ethylenically unsaturated comonomer present in the second phase is from about 5 to about 20 weight percent.

Typically, the ratio of vinylidene chloride monomer to ethylenically unsaturated comonomer present in the second phase is from about 75 to 25 to about 95 to 5 respectively. Preferably, the ratio of vinylidene chloride comononer to ethylenically unsaturated comonomer present in the second phase is from about 80 to 20 to about 95 to 5 weight percent respectively based on the total weight of monomer present in the second phase.

MOLECULAR WEIGHT OF COPOLYMERS

The molecular weight of the composite interpolymer particle is most practical when in the range of from about 50 to about 100 thousand weight average molecular weight ($M_w$). Conventionally known chain transfer agents are typically used to control the molecular weight of the interpolymer particles.

PROCESS OF PREPARING THE COPOLYMERS

The polymerization of the monomers is by conventional emulsion polymerization techniques. The first phase of ethylenically unsaturated monomer is typically fed into the reactor first, but the vinylidene chloride monomer and ethylenically unsaturated comonomer of the second phase can be initially added to the reactor. Typically, the monomer feed of the first charge is terminated before the second charge of monomer feeds is begun while the initiator feeds and surfactant feeds are continued throughout both the first and second feeds. After the copolymer emulsion is cooled and removed from the reactor, the particles are coagulated. Methods of coagulating the particles include: freezing the latex or shear or chemical coagulation. The polymer particles are then in a form usable for thermal processing. The particles are evaluated for clarity/miscibility and oxygen permeability as follows.

OXYGEN TRANSMISSION RATE ($O_2TR$) MEASUREMENT OF THE INTERPOLYMER

Sample films are prepared by compression molding (at 160° C. and 1000 psi for one minute then 35,000 psi for two minutes) the emulsion polymerized resin between two sheets of polyester film. The films are prepared at approximately 5-10 mil thickness. The barrier properties of the polyester film alone are evaluated and their contributions to the total permeability eliminated by subtraction prior to evaluating the interpolymer molded sample for barrier properties.

Samples are tested on the Mocon Oxtran 1050 Oxygen Permeability Tester. Oxygen permeability values are calculated from the mv response of the Oxtran 1050 detector at a specific temperature and pressure differential as well as sample thickness. The sample thickness is determined by taking multiple readings with a micrometer and averaging the results. Oxygen permeability values are reported in Dow Units (D.U.) which are cc·mil/100 in$^2$.day.atm at 25° C.

EXAMPLE 1

Into a 1-gallon glass-lined reactor are added 780 g of deionized water, and 21 grams of a seed latex containing polystyrene polymer particles which will render a resulting interpolymer particle of 1400 Angstroms. The reactor is purged with nitrogen and heated to 90 ° C. and over a two-hour period is added a first phase monomer stream containing 533 grams of methylmethacrylate, and 1.1 grams of a chain transfer agent. Beginning at the start of the monomer stream was added over a two-hour period, an aqueous stream containing 106 grams of water, 2.7 grams sodium persulfate and 5.3 grams of a 45 percent active solution of an alkylated diphenyl oxide disulfonate surfactant.

Following the addition of the monomer and aqueous streams, the reactor was cooled to 60° C. and over 5 hours is added the second phase of: 721 grams of vinylidene chloride, 46 grams of methylmethacrylate and 1.5 grams of a chain transfer agent. Added simultaneously over six hours are 0.4 grams of t-butyl hydroperoxide (7 percent solution) and 145 grams of water. Over six hours is also simultaneously added: 0.8 grams of sodium sulfoxylate formaldehyde and 7.67 grams of a 45 percent active solution of an alkylated diphenyl oxide disulfonate surfactant and 162 grams of water.

The latex is then freeze coagulated.

40 Grams of the copolymer is then entered into a Variable Shear Rate Plasti-Corder made by C.W. Brabender Instruments Inc. at 130° C. and 40 rpm, to measure the processability, i.e. heat stability of the copolymer. The compression molded sample is then prepared from 3–4 grams of either the dried coagulated polymer of the polymer exposed to the Shear Rate Plasti-Corder. Samples were molded between polyester film or heavy gauge aluminum foil at 160° C. using a one minute preheat at 1000 psi followed by 2 minutes at 35000 psi.

The oxygen permeability of the interpolymer is 0.15 DU. The clarity/miscibility of the interpolymer is evaluated by differential scanning calorimetry. The interpolymer exhibits one glass transition temperature at a temperature between those expected for each polymer phase individually and the compression molded samples are clear, indicating miscibility of the phases.

EXAMPLE 2

Example 2 is prepared similarly to Example 1 however, 21 grams of seed latex is used (to yield a particle having an average diameter of about 1400 Angstroms). The reactor is purged with nitrogen and heated to 90° C. and over a two-hour period is added a first phase monomer stream containing 94 grams of methylmethacrylate. Beginning at the start of the monomer stream was added over a two-hour period, an aqueous stream containing 47 grams of water, 0.5 grams sodium persulfate and 1 gram of a 45 percent active solution of an alkylated diphenyl oxide disulfonate surfactant.

Following the addition of the monomer and aqueous streams, the reactor was cooled to 60° C. and over 9 hours is added the second phase of: 1134 grams of vinylidene chloride, 72 grams of methyl acrylate. Added simultaneously over 10 hours are 8.6 grams of t-butyl hydroperoxide (7 percent solution) and 216 grams of water. Over 10 hours is also simultaneously added: 1.2 grams of sodium sulfoxylate formaldehyde and 26.8 grams of a 45 percent active solution of an alkylated diphenyl oxide disulfonate surfactant and 197 grams of water.

The latex is then freeze coagulated.

The oxygen permeability of the interpolymer is 0.22 DU. The clarity/miscibility of the interpolymer is evaluated by differential scanning calorimetry. The interpolymer exhibits one glass transition temperature at a temperature between those expected for each polymer phase individually and the compression molded samples are clear, indicating miscibility of the phases.

What is claimed is:

1. An emulsion polymerized interpolymer having two phases consisting essentially of: (a) a first phase of an effective amount of at least one ethylenically unsaturated monomer and (b) a second phase of an effective amount of vinylidene chloride monomer and at least one ethylenically unsaturated comonomer wherein the first and second phases are miscible with each other and wherein the ethylenically unsaturated monomer of the second phase is selected from the group consisting of: vinyl chloride, alkyl acrylates, alkyl methacrylates, acrylic acid, methacrylic acid, and itaconic acid and wherein the ethylenically unsaturated monomer of the first phase is selected from the group consisting of: methylmethacrylate; alkyl acrylates; and alkyl methacrylate monomer mixtures and wherein the effective amount of the ethylenically unsaturated monomer present in the first phase is from about 95 to about 5 weight percent based on total monomer present in the total interpolymer particle and wherein the effective amount of the ethylenically unsaturated comonomer present in the second phase is from about 5 to about 25 weight percent based on total monomer present in the second phase.

2. The emulsion polymerized interpolymer of claim 1 wherein the effective amount of the ethylenically unsaturated monomer present in the first phase is from about 80 to about 5 weight percent based on total monomer present in the total interpolymer particle.

3. The emulsion polymerized interpolymer of claim 1 wherein the effective amount of the ethylenically unsaturated monomer present in the first phase is from about 60 to about 5 weight percent based on total monomer present in the total interpolymer particle.

4. The emulsion polymerized interpolymer of claim 1 wherein the effective amount of the ethylenically unsaturated monomer present in the second phase is from about 5 to about 20 weight percent based on total monomer present in the second phase.

5. The emulsion polymerized interpolymer of claim 1 wherein the effective amount of vinylidene chloride monomer and ethylenically unsaturated comonomer present in the second phase of the interpolymer particle of the present invention is from about 5 to about 95 weight percent based on total monomer present in the total interpolymer particle.

6. The emulsion polymerized interpolymer of claim 1 wherein the effective amount of vinylidene chloride monomer and ethylenically unsaturated comonomer present in the second phase of the interpolymer particle of the present invention is from about 20 to about 95 weight percent based on total monomer present in the total interpolymer particle.

7. The emulsion polymerized interpolymer of claim 1 wherein the effective amount of vinylidene chloride monomer and ethylenically unsaturated comonomer present in the second phase of the interpolymer particle of the present invention is from about 40 to about 95 weight percent based on total monomer present in the total interpolymer particle.

* * * * *